Figures 1, 2:
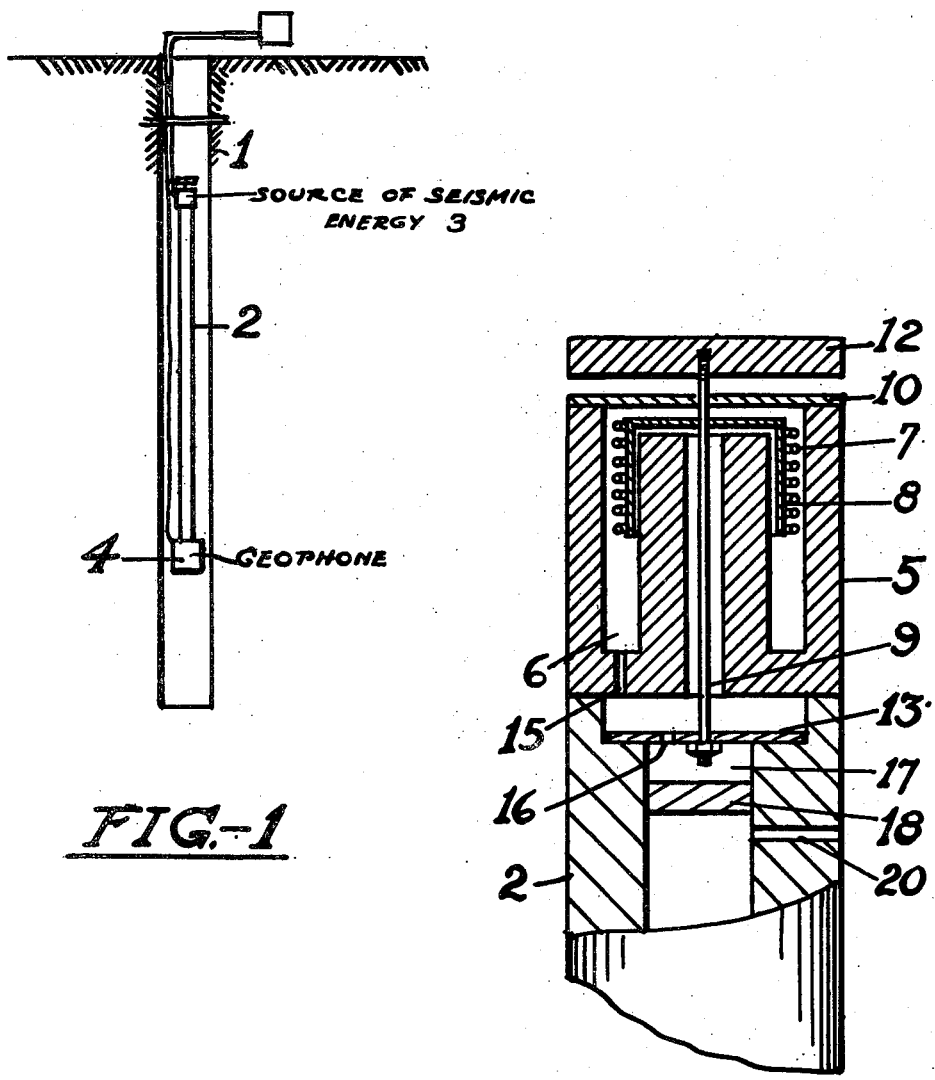

Patented Sept. 12, 1950

2,522,433

UNITED STATES PATENT OFFICE 2,522,433

SEISMIC WAVE TRANSMITTER

Robert S. Dahlberg, Jr., Caracas, Venezuela, assignor to Standard Oil Development Company, a corporation of Delaware Application October 24, 1947, Serial No. 781,941

3 Claims. (Cl. 177—7)

The present invention relates to geophysical prospecting. In particular the invention comprises an improved method for determining the velocity of seismic waves over known distances in the earth, whereby information as to the nature and characteristics of the substrata through which the waves pass may be determined.

In the determination of the nature of substrata in the earth according to the principles of seismography, an important factor to be determined is the velocity of propagation of seismic waves in the area of the earth being studied. For many purposes sufficient velocity information may be obtained by determining the average velocity of the seismic waves over rather long distances, generally over hundreds of feet. For many purposes, such as a more explicit knowledge of the characteristics of particular layers of the earth, it is highly desirable to precisely determine the velocity of seismic waves over a more limited distance. Thus in conventional oil drilling procedures, it is highly valuable to obtain all possible information regarding the earth through which a given hole is drilled. This is valuable for example in order to minimize the possibility of unknowingly drilling through a possible oil bearing strata. By accurately determining the velocity of seismic waves over narrow intervals of distance, as a new hole is drilled, information will be provided which materially aids in determining the nature of the earth through which the hole is drilled.

Various methods have been proposed for obtaining information relative to the velocity of seismic waves in the earth. One conventional method is to lower a geophone into a hole positioned at successively greater depths, that is, at greater distances from the surface. By detonating a charge of explosive when the geophone has been positioned at each successively lower point, the average velocity of seismic waves from the point of detonation to the particular position of the geophone may be obtained. It is then possible to plot the time required for seismic waves to reach each of the successive depths to which the geophone has been lowered. The slope of such a curve at any point will represent the velocity of seismic waves at that particular point. Likewise by drawing a line between two points on the curve, the slope of such a line will represent the average velocity over the corresponding difference in depth. However, due to the fact that the intervals of time being measured, on successively lowering the geophone, are exceedingly small, being in the range of milliseconds, this method is inherently inaccurate for the type of measurement desired. The method is not sufficiently accurate to indicate, with the required precision, the comparatively small velocity gradients which exist in different substrata. While the information obtained by such methods is valuable for many purposes, the need exists for a more accurate method of determining with extreme precision the velocity of seismic waves in the substrata being studied. It is the primary object of this invention to provide such a method; that is, to enable the determination of the velocity of seismic waves over short intervals in the subsurface of the earth with extreme precision.

In accordance with the present invention a long rod is lowered into the hole being drilled. On one end of the rod is positioned a source of seismic energy, propagating seismic energy which continuously varies in frequency in a predetermined manner. At the other end of the rod is positioned a geophone. It is apparent that during the propagation of seismic energy from the source on one end of the rod, to the receiving geophone on the other end of the rod, the frequency of the source, said to be varying continuously, will have changed. By comparing the frequency of the seismic source at the instant seismic waves are propagated, to the frequency of the seismic source, at the instant the geophone receives seismic energy from that source, it is possible to precisely determine the velocity of seismic waves through the earth adjacent to this rod. That is, the frequency difference determined as above will be indicative of the time required for seismic energy to proceed the length of the rod. Knowing the length of the rod, and the time interval required for seismic energy to travel over this distance, the velocity of the seismic waves may be readily computed. As small differences in frequency may be readily determined, this method is able to give seismic velocities with considerable accuracy.

The nature and objects of this invention may be fully understood by reference to the following description in connection with the accompanying drawings in which;

Fig. 1, diagrammatically represents the apparatus and procedure of the present invention, and;

Fig. 2, shows in cross-section detail the construction of the continuously varying source of seismic energy.

Referring to the drawing 1 represents a hole which has been drilled into the earth. 2 represents the rod to which a seismic energy source 3, and the geophone 4 is attached at opposite ends. The geophone and the seismic energy source may be either at the upper, or the lower end of this rod. The rod may be of any desired length, for example, 50 feet. Extending from the geophone, and from the source of seismic energy, are suitable electrical conductors carrying the electrical input signal driving the seismic source, and carrying the output of the receiving geophone to suitable apparatus 5 positioned on the surface of the earth. This apparatus is adapted to compare at any instant, the frequency of seismic waves being propagated by the seismic source, and the frequency of the seismic waves being received by the geophone. The nature of this apparatus will be hereafter described.

Referring now to Fig. 2, the source of seismic energy 3 may comprise a cylindrical magnet 5, which is attached to the end of the rod 2, by any suitable means. The magnet may be made of any desired magnetic material, such as the magnetic alloy of aluminum, nickel and cobalt known as Alnico. Cut into the magnet 5 is an annular channel 6 which accommodates a coil 7, mounted on a coil form 8. Fixed to the center of the coil form 8 is a rod 9 extending through a central clearance hole in the magnet. The rod 9 extending upwardly is sealed to an elastic diaphragm 10, which is securely attached, and sealed to the magnet by suitable means. The uppermost end of the rod 9 terminates in a mass element 12 to which the rod 9 is securely attached. The lower end of the rod 9 is fixed to an elastic diaphragm 13. This configuration serves to maintain the rod 9 in desired alignment within the circular bore of the magnet, but at the same time permits vertical movement, or vibration of the rod 9. On application of an alternating voltage of continuously varying frequency, the rod 9 and the mass 12 will be caused to vibrate in a vertical direction on the same principle as that of a dynamic speaker. By filling the hole 1, in which the seismic source of Fig. 2, is positioned, with drilling mud, or a liquid, seismic energy of continuously varying frequency will be propagated into the earth adjacent to the hole. In order to seal the components of the seismic source against the introduction into the coil of drilling mud from the hole, oil is maintained in the annular space 6. A reservoir for the oil 17 is maintained in the end of the rod 2, adjacent to the assembly described. Drill holes 15 in the magnet, and 16 in the lower diaphragm permit circulation of the oil from the reservoir to the annular space of the magnet. A plunger 18, which may be constructed of leather, is provided to seal the oil reservoir against contamination by drilling mud through the hole 20. At the same time the plunger 18, and the hole 20, permit equalization of the pressure of the entrapped oil and the drilling mud in the surrounding hole, to prevent any damping of the movement of the mass 12, due to a difference of pressure within and without the apparatus.

In accordance with my invention, I impress an alternating voltage of continuously varying frequency across the coil 8. A particularly desirable form of frequency variation for the purposes of the present invention is one in which the frequency of the alternating voltage increases linearly from a minimum to a maximum, and back to a minimum frequency over fixed intervals of time. Suitable frequencies are in the range of about 50 cycles for the minimum frequency, and 500 cycles for the maximum frequency. A suitable interval of time, or a suitable rate of change of frequency, may be about ½ second for one complete cycle of frequency change. When such an alternating voltage is applied to the coil 8, the mass 12, will be caused to produce seismic energy having the frequency characteristics of the alternating voltage. At any given instant $t_1$, the frequency generated by the seismic source may be said to be $f_1$. At any other time $t_2$, equal to the time required for the propagated seismic energy $f_1$ to reach the geophone, the frequency of the seismic source will have changed to a value $f_2$. From a straight line graph of frequency variation versus time, constructed in the manner shown, for example, by Beers in U. S. patent, 2,231,243 the time interval proportional to the change in frequency $f_2$ minus $f_1$ may be determined. This time interval will equal the length of time required for the seismic energy to pass along the length of the rod, said to be 50 feet, over one or more paths. One path of energy will be directly along, or through the rod 2 to the geophone 4, another course of seismic energy will be outward from the seismic source, into and through the drilling mud in the hole to the geophone 4. Still another path of seismic energy will be along the walls of the drilling hole between the seismic source and the geophone. Other paths of seismic energy will also extend with varying degrees of curvature through the earth adjacent to the hole. By determining all difference frequencies, $f_2$ minus $f_1$, the time intervals required for the seismic energy to pass along these paths will be determined. One of these time intervals will represent the time required for seismic energy to travel through the rod 2. Another interval will represent the time required for seismic energy to travel through the drilling mud in the hole. These intervals may be predetermined as the seismic velocities for the rod and drilling mud are known. A third interval will represent the time required for seismic energy to travel through strata immediately adjacent to the hole. Larger time intervals will indicate longer paths of travel through the adjacent earth formations. Since differences of frequencies may be readily and accurately determined by means known to the electronic and radio arts, it is apparent that this apparatus and procedure are capable of determining the velocity of seismic waves along the paths indicated, with extreme precision.

By way of example, a suitable method of determining the difference frequencies is to impress the output of the geophone and the input of the input of the source of seismic energy on an electronic mixing circuit. The mixer will combine the input frequencies to give output frequencies equal to the difference frequencies. A conventional electronic frequency meter may be used to convert the difference frequencies to electrical impulses which may be rectified to activate a D. C. meter which may be calibrated to directly indicate either the difference frequencies or the time interval represented by particular difference frequencies.

Any convenient means may be used for obtaining the desired frequency characteristics of the alternating current voltage used to produce the seismic energy. For example, one well known method suitable for use in this invention consists in providing an opaque disc placed between a light source and a photocell, the edge of the disc being constructed in the form of a sine wave. The frequency of the sine curves around the circumference of the disc is made to linearly increase, and decrease, from a minimum to a maximum value and back to a minimum value. The photocell and light source are so positioned, relative to the circumference of the disc, that the direct path of light from the light source to the photocell passes through the median point of the sine curves. By revolving the disc at a suitable constant speed, the frequency of light impinging on the photocell, and the frequency of the A. C. voltage developed by the photocell will vary linearly.

Another alternative means for obtaining the desired voltage characteristic is to employ a beat frequency oscillator. The beat frequency oscillator will comprise the combined outputs of two oscillators A and B. One oscillator A, may have a frequency of 50 kilocycles, while the other oscillator B, may have a variable frequency linearly varying between 50,500 cycles and 50,050 cycles. By beating together the output of these oscillators an A. C. voltage of continuously varying frequency between 50 and 500 cycles, as described, will be produced. Having now fully described my invention, I claim:

1. Improved apparatus for introducing seismic energy into the earth at a selected point, comprising a cylindrical magnet provided with a central bore and an annular channel, a driving rod positioned longitudinally within said central bore, a coil positioned within said annular channel and provided with means mechanically connecting said coil with said driving rod, a mass element attached to said driving rod, and flexible diaphragms attached to said rod and positioned at each end of said magnet in a manner providing for alignment of said driving rod within said central bore.

2. Improved apparatus for introducing seismic energy into the earth at a selected point adjacent a fluid-filled borehole, comprising a cylindrical magnet provided with a central bore and an annular channel, a driving rod positioned longitudinally within said central bore, a coil positioned within said annular channel and provided with means mechanically connecting said coil with said driving rod, a mass element attached to said driving rod, flexible diaphragms attached to said rod and fastened to each end of said magnet in a manner providing for alignment of said driving rod within said central bore, said diaphragms defining with said central bore and said annular channel an oil-tight chamber, a reservoir for oil positioned adjacent the magnet and communicating with said chamber, and means associated with said reservoir adapted to maintain a pressure balance between oil placed in said reservoir and fluid in said borehole.

3. Improved apparatus according to claim 2 in which said reservoir comprises a body having a cylindrical bore placed adjacent the exterior side of one of said diaphragms and a plunger slidably fitted within said bore, communication between said reservoir and said oil-tight chamber being established through an opening provided in said last-named diaphragm, and an opening being provided in said body to establish communication between said cylindrical bore beyond said plunger and fluid in said borehole, thereby adapting said plunger to function as said pressure balancing means.

ROBERT S. DAHLBERG, Jr.

REFERENCES CITED

The following references are of record in the file of this patent:

UNITED STATES PATENTS

| Number | Name | Date |
|---|---|---|
| 1,318,739 | Fessenden | Oct. 14, 1919 |
| 1,369,764 | Van Der Bijl | Feb. 22, 1921 |
| 1,464,729 | Severy | Aug. 14, 1923 |
| 1,808,149 | Smith | June 2, 1931 |
| 1,923,959 | Williams | Aug. 22, 1933 |
| 2,135,328 | Critchfield | Nov. 1, 1938 |
| 2,191,120 | Slichter | Feb. 20, 1940 |
| 2,231,243 | Beers | Feb. 11, 1941 |
| 2,433,746 | Doll | Dec. 30, 1947 |

FOREIGN PATENTS

| Number | Country | Date |
|---|---|---|
| 667,357 | France | June 10, 1929 |

OTHER REFERENCES

Article "Photoelectric Tone Generator," "Electronics" Magazine for September 1946, pages 93, 94 and 95.